(12) United States Patent
Wrobel et al.

(10) Patent No.: US 10,118,604 B1
(45) Date of Patent: Nov. 6, 2018

(54) SYSTEM AND METHOD FOR IMPROVED BATTERY PRE-CHARGE AND DEACTIVATION TIMING IN TRAFFIC

(71) Applicant: Toyota Motor Engineering & Manufacturing North America, Inc., Erlanger, KY (US)

(72) Inventors: Shannon A. Wrobel, Ann Arbor, MI (US); Joshua D. Payne, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 15/644,319

(22) Filed: Jul. 7, 2017

(51) Int. Cl.

| B60W 20/11 | (2016.01) |
|---|---|
| G01S 19/42 | (2010.01) |
| B60W 20/12 | (2016.01) |
| B60W 20/14 | (2016.01) |
| B60W 10/06 | (2006.01) |
| B60W 10/18 | (2012.01) |
| B60W 30/18 | (2012.01) |
| G01C 21/34 | (2006.01) |

(52) U.S. Cl.
CPC ............ *B60W 20/11* (2016.01); *B60W 10/06* (2013.01); *B60W 10/18* (2013.01); *B60W 20/12* (2016.01); *B60W 20/14* (2016.01); *B60W 30/18127* (2013.01); *G01C 21/3469* (2013.01); *G01C 21/3492* (2013.01); *G01S 19/42* (2013.01); *B60W 2510/244* (2013.01); *B60W 2520/10* (2013.01); *B60W 2540/10* (2013.01); *B60W 2540/12* (2013.01); *B60W 2550/20* (2013.01); *B60W 2550/402* (2013.01); *B60W 2550/406* (2013.01); *B60W 2710/06* (2013.01); *B60W 2710/18* (2013.01); *B60W 2720/10* (2013.01); *Y10S 903/93* (2013.01)

(58) Field of Classification Search
USPC .......................................................... 701/22
See application file for complete search history.

(56) References Cited

U.S. PATENT DOCUMENTS

| 6,483,198 B2 | 11/2002 | Schmitz et al. |
|---|---|---|
| 7,617,041 B2 | 11/2009 | Sera |
| (Continued) | | |

FOREIGN PATENT DOCUMENTS

EP        1378721        1/2004

*Primary Examiner* — Tyler D Paige
(74) *Attorney, Agent, or Firm* — Snell & Wilmer LLP

(57) ABSTRACT

Methods, systems, and apparatus for managing energy efficiency of a vehicle. The system includes a GPS unit configured to detect a current location of the vehicle. The system includes a network access device configured to receive traffic data. The system includes a navigation unit configured to determine whether traffic is upcoming along a route based on the traffic data. The system includes a speed sensor configured to detect a current speed of the vehicle. The system includes an electronic control unit configured to activate a pre-charge mode when the upcoming slowdown in vehicle speed is determined, the pre-charge mode causing the engine to charge the battery via the motor/generator. The electronic control unit is configured to deactivate the pre-charge mode to prevent charging of the battery by the engine when the detected current speed of the vehicle is below a speed threshold for a set period of time or distance.

20 Claims, 5 Drawing Sheets

(56) References Cited

U.S. PATENT DOCUMENTS

| | | |
|---|---|---|
| 7,665,559 B2 | 2/2010 | De La Torre-Bueno |
| 7,856,310 B2 | 12/2010 | Phuyal et al. |
| 8,838,385 B2 | 9/2014 | Van Wiemeersch |
| 8,918,376 B2 | 12/2014 | Ambrosio et al. |
| 8,983,725 B2 | 3/2015 | Breu |
| 9,205,843 B2 | 12/2015 | Sannodo et al. |
| 9,286,793 B2 | 3/2016 | Pan et al. |
| 9,428,173 B2 | 8/2016 | Stefanon et al. |
| 9,457,743 B2 | 10/2016 | Soleski et al. |
| 9,701,302 B2 * | 7/2017 | Matsunaga ............ B60W 20/12 |
| 2005/0096839 A1 | 5/2005 | Nakano et al. |
| 2010/0019718 A1 * | 1/2010 | Salasoo ................ B60L 3/0046 320/103 |
| 2010/0280712 A1 | 11/2010 | Bowman |
| 2013/0179007 A1 * | 7/2013 | Dalum ................ B60W 10/06 701/2 |
| 2014/0018975 A1 * | 1/2014 | Maslyn ................ H01M 10/44 701/2 |
| 2015/0298680 A1 * | 10/2015 | Matthews ............ B60W 20/00 701/22 |
| 2015/0329102 A1 * | 11/2015 | Yoshikawa ......... B60W 30/182 701/22 |
| 2016/0137089 A1 | 5/2016 | Wu et al. |
| 2016/0332616 A1 * | 11/2016 | Zhao .................... B60W 20/13 |

* cited by examiner

SYSTEM AND METHOD FOR IMPROVED BATTERY PRE-CHARGE AND DEACTIVATION TIMING IN TRAFFIC

BACKGROUND

1. Field

This specification relates to a system and a method for improving battery pre-charging systems of vehicles having an engine and a motor/generator.

2. Description of the Related Art

Hybrid vehicles may include a system for charging a battery used to power an electric motor/generator. The battery may be charged by a regenerative braking system. As the wheels of the vehicle turn, regenerative braking generates electricity from the turning of the axles connected to the wheels. In generating the electricity from the turning of the wheels, the regenerative braking provides resistance to the axles of the vehicle, resulting in a slowing down of the vehicle. The battery may also be charged by the engine powering the electric motor/generator.

In certain situations, more use of the engine than the motor/generator may be preferable. For example, when accelerating rapidly, the engine is able to more effectively propel the vehicle. In other situations, more use of the motor/generator may be preferable. For example, when stuck in traffic, the motor/generator more efficiently powers the vehicle at low speeds than the engine does. Accordingly, determining when to use the motor/generator instead of the engine (and vice versa) may increase efficiency of the vehicle and/or performance.

SUMMARY

What is described is a system for managing energy efficiency of a vehicle having an engine, a motor/generator, and a battery. The system includes a GPS unit configured to detect a current location of the vehicle. The system also includes a network access device configured to receive traffic data from a remote data server, the traffic data including locations and vehicle speeds at the locations. The system also includes a navigation unit connected to the GPS unit and configured to determine a route to a destination and determine whether a slowdown in vehicle speed is upcoming along the route based on the traffic data. The system also includes a speed sensor configured to detect a current speed of the vehicle. The system also includes a battery sensor configured to detect a current state of charge of the battery. The system also includes an electronic control unit connected to the navigation unit, the speed sensor, and the battery sensor. The electronic control unit is configured to activate a pre-charge mode when the upcoming slowdown in vehicle speed is determined by the navigation unit, the pre-charge mode causing the engine to charge the battery via the motor/generator. The electronic control unit is also configured to deactivate the pre-charge mode to prevent charging of the battery by the engine when the detected current speed of the vehicle is below a speed threshold for a set period of time or distance.

Also described is a hybrid vehicle having an engine, a motor/generator, and a battery. The vehicle includes a GPS unit configured to detect a current location. The vehicle also includes a network access device configured to receive traffic data from a remote data server, the traffic data including locations and vehicle speeds at the locations. The vehicle also includes a navigation unit connected to the GPS unit and configured to determine a route to a destination and determine whether a slowdown in vehicle speed is upcoming along the route based on the traffic data. The vehicle also includes a speed sensor configured to detect a current speed. The vehicle also includes a battery sensor configured to detect a current state of charge of the battery. The vehicle also includes an electronic control unit connected to the navigation unit, the speed sensor, and the battery sensor. The electronic control unit is configured to activate a pre-charge mode when the upcoming slowdown in vehicle speed is determined by the navigation unit, the pre-charge mode causing the engine to charge the battery via the motor/generator. The electronic control unit is configured to deactivate the pre-charge mode to prevent charging of the battery by the engine when the detected current speed is below a speed threshold for a set period of time or distance.

Also described is a method for managing energy efficiency of a vehicle having an engine, a motor/generator, and a battery. The method includes detecting, by a GPS unit, a current location of the vehicle. The method also includes receiving, by a network access device, traffic data from a remote data server, the traffic data including locations and vehicle speeds at the locations. The method also includes determining, by a navigation unit connected to the GPS unit, a route to a destination and determining whether a slowdown in vehicle speed is coming up along the route based on the traffic data. The method also includes detecting, by a speed sensor, a current speed of the vehicle. The method also includes detecting, by a battery sensor, a current state of charge of the battery. The method also includes activating, by an electronic control unit, a pre-charge mode when the upcoming slowdown in vehicle speed is determined by the navigation unit, the pre-charge mode causing the engine to charge the battery via the motor/generator. The method also includes deactivating, by the electronic control unit, the pre-charge mode to prevent charging of the battery by the engine when the detected current speed of the vehicle is below a speed threshold for a set period of time or distance.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles and methods for an improved battery pre-charge system based on traffic detection. A battery pre-charge system may detect when a situation occurs where increased motor/generator use is desirable, and may use the engine to increase the state of charge of the battery in anticipation of the increased motor/generator use. For example, when a vehicle is moving slowly for extended periods of time, use of the motor/generator to propel the vehicle is more energy efficient than using the engine. Increased use of the engine to charge the battery in anticipation of increased motor/generator use may be referred to as a pre-charge mode.

However, the vehicle may not immediately detect that the traffic has been encountered and may operate in pre-charge mode longer than is optimal. When the vehicle remains operating under the pre-charge mode at low speeds, the engine use is higher than an optimal balance of engine and motor/generator use, resulting in sub-optimal energy efficiency. A traffic data signal received by the vehicle may be used to determine whether the vehicle is in traffic. However, use of the received traffic data signal alone may not be sufficient to accurately determine whether the vehicle is in traffic, as the refresh rate of the traffic data may not be sufficiently frequent. Instead of relying on traffic data to determine whether the vehicle is in traffic, other methods may be used, such as vehicle speed, the braking and accelerating patterns of the vehicle, and deceleration rate. These other methods of determining whether the vehicle is in traffic may be more accurate and more reliable than using traffic data alone.

By using the improved battery pre-charge system as described herein, the vehicle may make improvements in energy efficiency by increased use of the motor/generator in traffic situations, while still pre-charging the battery in anticipation of upcoming traffic. In addition to increased energy efficiency, other benefits and advantages include reduced wear on the components of the engine and the vehicle and reduced emissions from reduced use of the engine when the vehicle is in traffic.

As used herein, a particular area or portion of a road may be determined as having traffic when the vehicle speed of the vehicles in the particular area is substantially lower compared to the vehicle speed of vehicles in adjacent areas. A particular area or portion of a road may be determined as having traffic when the ratio of the vehicle speed of the vehicles in the particular area and the speed limit of the particular area is below a threshold. A particular area or portion of a road may be determined as having traffic when the ratio of the vehicle speed of the vehicles in the particular area and the customary vehicle speed of vehicles in the particular area is below a threshold.

Figure 1:
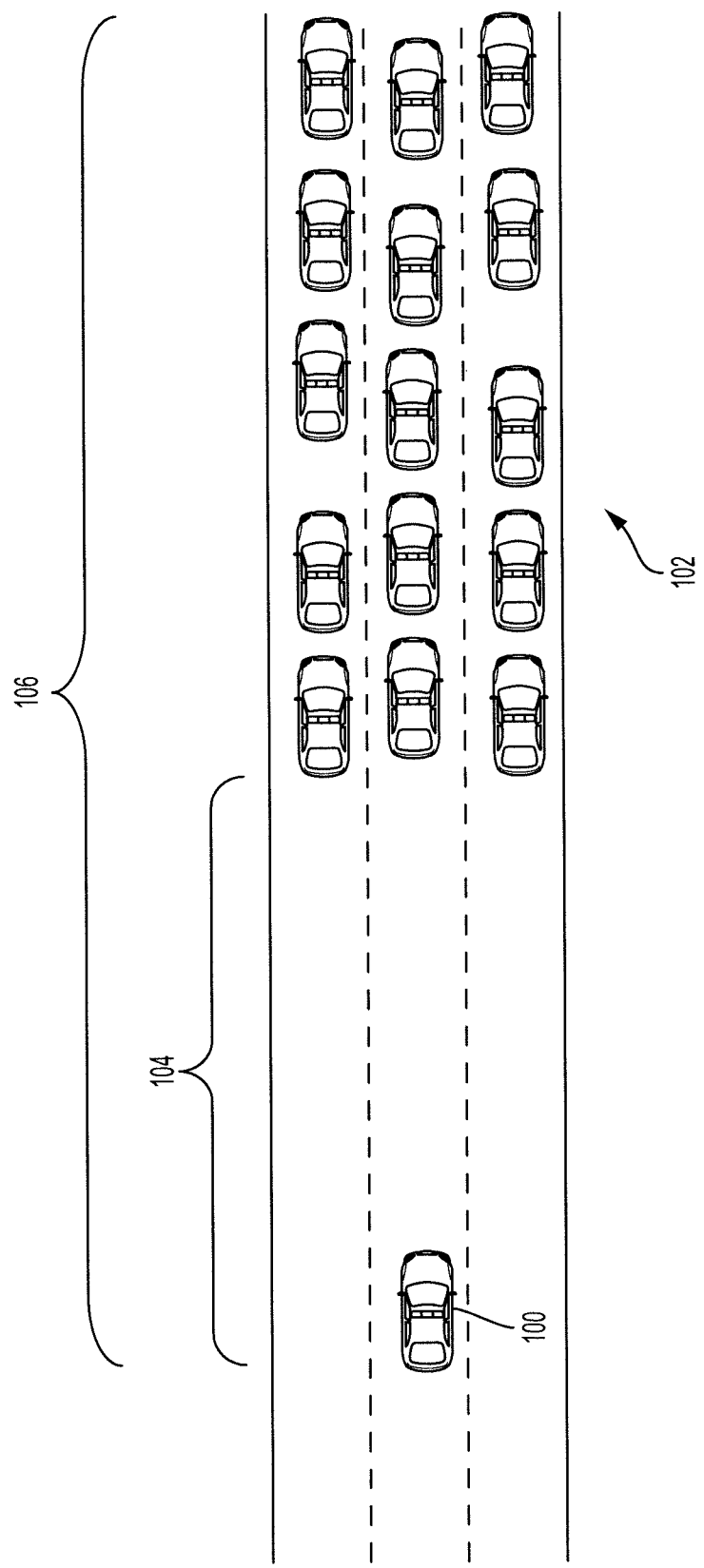
FIG. 1 is an example situation where the improved battery pre-charge and deactivation system may be used, according to an aspect of the invention.

FIG. 1 is an example situation where the improved battery pre-charge and deactivation system may be used, according to an aspect of the invention. The vehicle 100 may be travelling along a road, such as a freeway, at a high rate of speed (e.g., 55 miles per hour or more). The vehicle 100 may also be approaching traffic (or vehicle congestion) 102. The vehicle 100 may be powered solely by or by a combination of gasoline, electrical energy stored in a battery, or a fuel cell. The vehicle 100 may be a vehicle driven by a human user or may be semi-autonomously or fully autonomously operated.

The vehicle 100 may also include a pre-charge mode, which anticipates the vehicle 100 being in traffic 102, and pre-charges the battery of the vehicle 100. In the pre-charge mode, the battery of the vehicle 100 is pre-charged in anticipation of increased motor/generator use while the vehicle 100 is in traffic 102. The motor/generator of the vehicle 100 is more energy efficient at lower speeds than the engine is. Accordingly, the motor/generator is used as much as possible while the vehicle 100 is in traffic. To ensure maximum motor/generator use while in traffic, the battery is pre-charged as the vehicle 100 approaches the traffic 102. As shown in FIG. 1, when the vehicle 100 approaches the traffic 102 over the approaching distance 104, the pre-charge mode should be engaged.

In the pre-charging mode, the engine may be run at a higher speed to generate additional power, and the motor/generator converts the additional power into electrical energy to be stored in the battery. The additional power generation by the battery is most efficient when the engine is operating at high speeds. Therefore, when the vehicle 100 is moving slowly, additional power generation by the engine, for the battery, may not be desirable.

In some situations, the pre-charge mode may not result in the most efficient operation of the vehicle 100, and accordingly may be disabled. For example, when the vehicle 100 is in traffic 102, use of the pre-charge mode may result in the engine operating at a higher speed than necessary in order to constantly bring the state of charge of the battery to a pre-charge target level. In these situations, the vehicle 100 may operate more efficiently if the pre-charge mode is disabled at low speeds and the vehicle 100 operates substantially (or exclusively) using the motor/generator.

In these situations, the pre-charge mode may be disabled (or deactivated or turned off) when it is detected that the vehicle 100 is in traffic 102. The vehicle 100 may detect that it is in traffic based on traffic data received from a traffic server. However, the traffic data may be received in intervals which are not frequent enough to be useful. For example, when the traffic data is received every 60 seconds, the vehicle 100 may be operating inefficiently in the pre-charge mode while in traffic for up to 60 seconds longer than necessary. In addition, the traffic data may not be reliably accurate. Delays in sensors updating the state of traffic to the traffic server and delays in the traffic server communicating the traffic data to the vehicle 100 may cause the traffic data received by the vehicle 100 to be inaccurate. Further the traffic data may not be sufficiently precise. The traffic data may identify the traffic state of a street or a freeway, but may not identify the traffic state of the street or the freeway on a lane-by-lane basis. The vehicle 100 may be travelling in a lane which is moving faster than the surrounding traffic (e.g., a carpool lane) or in a lane which is moving slower than the surrounding traffic (e.g., in a lane where an accident occurred a short time ago). In either case, the pre-charge mode may be used less or more than is optimal.

Instead of using traffic data, the vehicle 100 may use systems on the vehicle 100 itself to determine whether the vehicle 100 is or is not in traffic 102.

Figure 2:
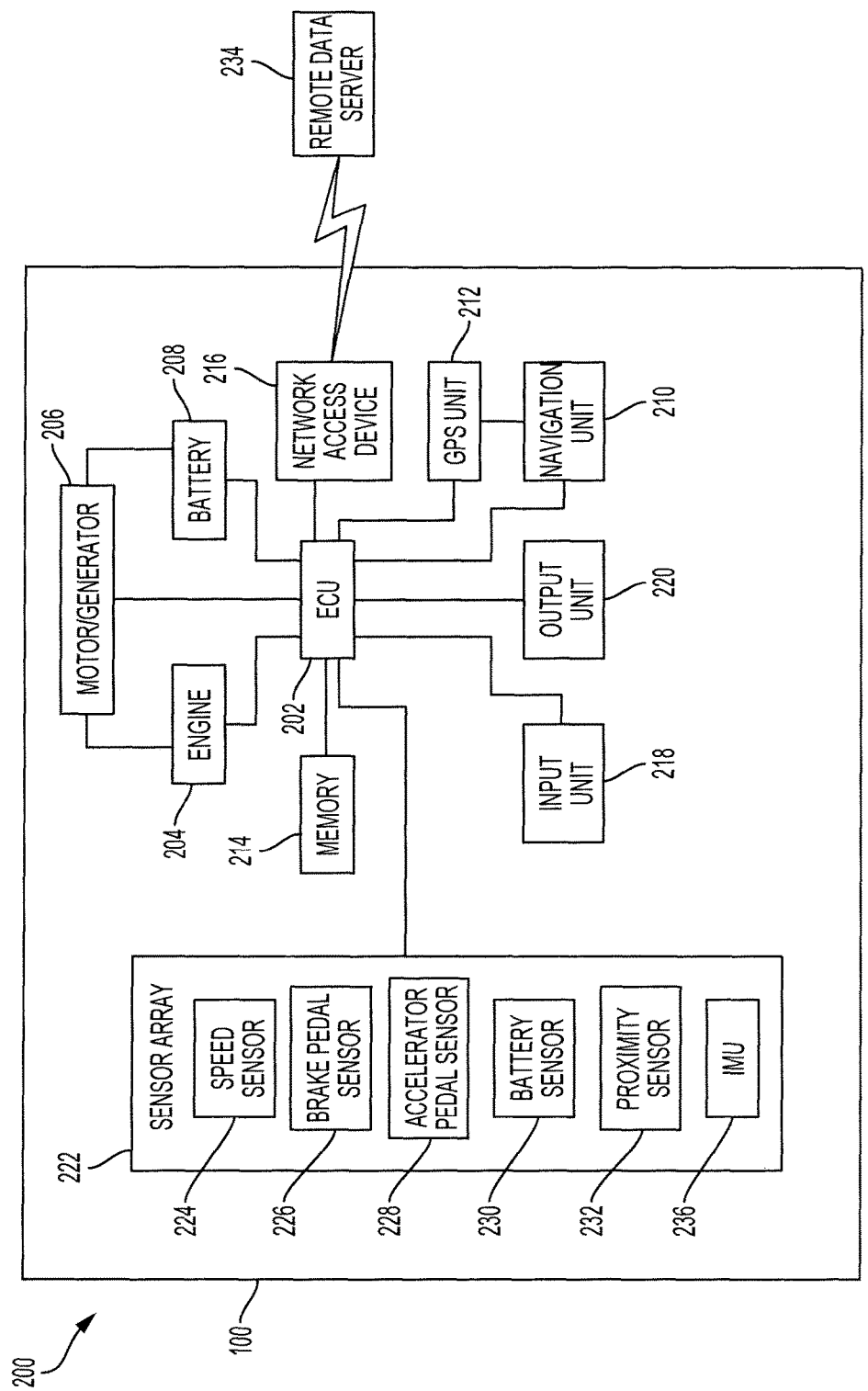
FIG. 2 is a block diagram of an example improved battery pre-charge and deactivation system, according to an aspect of the invention.

FIG. 2 is a block diagram of the system 200, according to various embodiments of the invention. The system 200 may include a vehicle 100. The vehicle 100 may include one or more computers or electronic control units (ECUs) 202, appropriately programmed, to control one or more operations of the vehicle 100. The vehicle 100 may also include an engine 204, a motor/generator 206, a battery 208, a navigation unit 210, a GPS unit 212, a memory 214, a network access device 216, an input unit 218, an output unit 220, a sensor array 222 including a vehicle speed sensor 224, a brake pedal sensor 226, an accelerator pedal sensor 228, a battery sensor 230, a proximity sensor 232, and an inertial measurement unit 236. The system also includes a remote data server 234.

The vehicle 100 is a conveyance capable of transporting a person, an object, or a permanently or temporarily affixed apparatus. The vehicle 100 may be a self-propelled wheeled conveyance, such as a car, sports utility vehicle, truck, bus, van or other motor or battery driven vehicle. For example, the vehicle 100 may be an electric vehicle, a hybrid vehicle, a plug-in hybrid vehicle or any other type of vehicle that includes the motor/generator 206. Other examples of vehicles include bicycles, trains, planes, or boats, and any other form of conveyance that is capable of transportation. The vehicle 100 may be a semi-autonomous vehicle or an autonomous vehicle. That is, the vehicle 100 may be self-maneuvering and navigate without human input. An autonomous vehicle may use one or more sensors from the sensor array 222 and/or the navigation unit 210 to drive autonomously.

The vehicle 100 may be coupled to a network. The network, such as a local area network (LAN), a wide area network (WAN), a cellular network, a digital short-range communication (DSRC), the Internet, or a combination thereof, connects the vehicle 100 to the remote data server 234. The remote data server 234 may be one or more servers from different service providers. Each of the one or more servers may be connected to one or more databases. A service provider may provide navigational map, weather and/or traffic data to the vehicle 100.

A database is any collection of pieces of information that is organized for search and retrieval, such as by a computer or a server, and the database may be organized in tables, schemas, queries, report, or any other data structures. A database may use any number of database management systems and may include a third-party server or website that stores or provides information. The information may include real-time information, periodically updated information, or user-inputted information. A server may be a computer in a network that is used to provide services, such as accessing files or sharing peripherals, to other computers in the network. A website may be a collection of one or more resources associated with a domain name.

The navigational map information includes political, roadway and construction information. The political information includes political features such as cities, states, zoning ordinances, laws and regulations, and traffic signs, such as a stop sign, or traffic signals. For example, laws and regulations may include the regulated speed on different portions of a road or noise ordinances. The roadway information includes road features such the grade of an incline of a road. The construction information includes construction features such as construction zones and construction hazards.

The traffic data includes one or more traffic condition features, such as traffic congested areas or accident areas. The traffic data may provide information related to the density and movement of vehicles on a roadway and/or accident locations.

The features, e.g., road features, political features, or traffic data, each have a location that may be identified by map coordinates. The map coordinates may be defined by latitude and longitudinal coordinates.

The vehicle 100 may include an engine 204, a motor/generator 206, and a battery 208. The motor/generator 206 may be an electric motor and/or an electric generator that converts electrical energy into mechanical power, such as torque, and/or converts mechanical power into electrical energy. The motor/generator 206 may be coupled to the battery 208. The motor/generator 206 may convert the energy from the battery 208 into mechanical power, and may provide energy back to the battery 208, for example, via regenerative braking. In some embodiments, the vehicle 100 may include one or more additional power generation devices, such as the engine 204. The engine 204 combusts fuel to provide power instead of and/or in addition to the power supplied by the motor/generator 206. The engine 204 may also charge the battery 208 via the motor/generator 206.

The battery 208 may be coupled to the motor/generator 206 and may provide electrical energy to and receive electrical energy from the motor/generator 206. The battery 208 may include one or more rechargeable batteries.

The one or more ECUs 202 may be implemented as a single ECU or in multiple ECUs. The ECU 202 may be electrically coupled to some or all of the components of the vehicle 100. The ECU 202 may include one or more processors or controllers specifically designed for optimizing energy efficiency. For example, the ECU 202 may determine when to activate and deactivate the pre-charge mode, particularly when the vehicle 100 is approaching traffic or in traffic.

The memory 214 may be coupled to the ECU 202. The memory 214 may store instructions to execute on the ECU 202 and may include one or more of a RAM or other volatile or non-volatile memory. The memory 214 may be a non-transitory memory or a data storage device, such as a hard disk drive, a solid-state disk drive, a hybrid disk drive, or other appropriate data storage, and may further store machine-readable instructions, which may be loaded and executed by the ECU 202. The memory 214 may store map data and threshold data relating to various threshold values described herein.

The network access device 216 may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G or 4G). The network access device 216 may transmit data to and receive data from devices and systems not directly connected to the vehicle 100. For example, the ECU 202 may communicate with the remote data server 234. Furthermore, the network access device 216 may access the network, to which the remote data server 234 is also connected.

The sensor array 222 may be coupled to the ECU 202 and include a vehicle speed sensor 224, an accelerator pedal sensor 228, a brake pedal sensor 226, a battery sensor 230, one or more proximity sensors 232, an inertial measurement unit 236, and/or one or more other sensors configured to detect data associated with the vehicle 100 or the environment around the vehicle 100.

The vehicle speed sensor 224 is configured to measure a current speed of the vehicle 100. The brake pedal sensor 226 is configured to measure an engagement or amount of pressure applied to the brake pedal. The accelerator pedal sensor 228 is configured to measure an engagement or amount of pressure applied to the accelerator pedal. The one or more proximity sensors 232 may be positioned on the front and/or the rear of the vehicle 100 to detect surrounding vehicles and/or objects that are within a threshold distance of the vehicle 100 in the front and/or the back of the vehicle 100, respectively. The proximity sensor may use a radar, a camera, vehicle-to-vehicle (V2V) communications or other means to detect and/or measure a distance to the other vehicles or objects. The sensors in the sensor array 222 may include one or more cameras that may be used to identify a driver to determine the driver's response time and/or other driver specific configurations to control the vehicle 100. The battery sensor 230 is connected to the battery 208 and configured to detect a current state of charge of the battery

208. The inertial measurement unit (IMU) 236 is configured to detect inertial data including an acceleration or deceleration of the vehicle 100.

The navigation unit 210 may be coupled to the ECU 202 and provide vehicle information and/or navigation information to the ECU 202. The vehicle information may include the current location, the direction and/or the speed of the vehicle 100. The navigation information may include a route that the vehicle 100 is or will be travelling. The route may include a starting location, a destination location and/or a path between the starting location and the destination location. The navigation unit 210 may use location data received from the GPS unit 212 to determine the vehicle information and/or the navigation information. The GPS unit 212 is configured to receive GPS signals and determine the location data.

The input unit 218 is configured to receive an input from a driver or a passenger of the vehicle 100. The input unit 218 may be a touch screen display, a keyboard, a microphone, or a camera, for example. The output unit 220 is configured to output information to the driver or the passenger of the vehicle 100. The output unit 220 may be a display or a speaker, for example.

Figure 3:
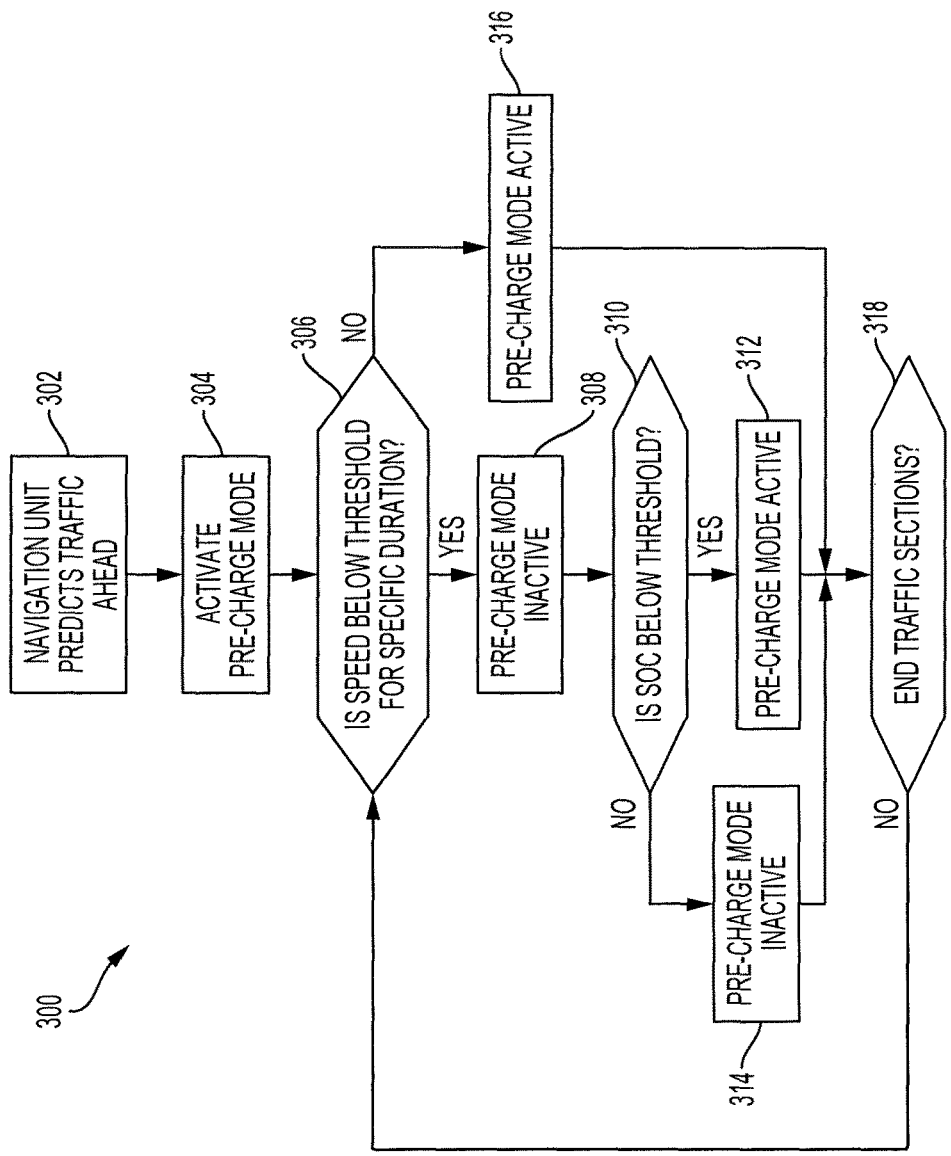
FIG. 3 is a flow diagram of an example process used by the improved battery pre-charge and deactivation system, according to an aspect of the invention.

FIG. 3 is a flow diagram of an example process 300 of the system, according to an aspect of the invention. One or more computers or one or more data processing apparatuses, for example, the ECU 202 of the system 200 of FIG. 2, appropriately programmed, may implement the process 300.

The navigation unit 210 determines whether there is traffic ahead of the vehicle 100 (step 302). In some embodiments, the navigation unit 210 determines a route to guide the vehicle 100 on using the current location of the vehicle and a desired destination. The navigation unit 210 may determine whether there is traffic present on the route based on traffic data received by the remote data server 234. The navigation unit 210 may receive the traffic data from the remote data server 234 via the network access device 216.

The navigation unit 210 may use a threshold distance ahead of the vehicle 100 on the route in determining whether traffic is ahead of the vehicle 100. For example, the threshold traffic distance may be 2 miles ahead of the vehicle 100 on the route, such that if the traffic data indicates that there is traffic at any point within 2 miles of the vehicle 100 on the route, then the navigation unit 210 determines that there is traffic ahead of the vehicle 100.

The navigation unit 210 may use a threshold time ahead of the vehicle 100 on the route in determining whether traffic is ahead of the vehicle 100. For example, the threshold traffic time may be 2 minutes ahead of the vehicle 100 on the route, such that if the traffic data indicates that there is traffic at any point within 2 minutes of the vehicle (based on the vehicle's 100 current speed), then the navigation unit 210 determines that there is traffic ahead of the vehicle 100.

Whether traffic is present on any given part of a road may be determined by an administrator of the remote data server 234, such as a traffic detection and reporting service. Whether traffic is present on a given part of the road may be determined by the navigation unit 210 based on the traffic data when the traffic data includes an expected vehicle speed at the given part of the road. For example, the traffic data may indicate that the vehicle speed on the road ahead of the vehicle 100 on the route for the next 10 miles is 65 miles per hour. In this case, the navigation unit 210 may determine that there is no traffic. However, if the traffic data indicates that the vehicle speed on the road ahead of the vehicle 100 on the route for the next 10 miles is 21 miles per hour, the navigation unit 210 may determine that there is traffic.

When traffic is detected ahead of the vehicle 100 along the route, the pre-charge mode is activated (step 304). The navigation unit 210 may communicate an indication to the ECU 202 to activate the pre-charge mode. As described herein, when the pre-charge mode is active, the engine 204 operates at a higher power than normal and stores the additional power in the battery 208 via the motor/generator 206. Generation of the extra power is performed most efficiently at high engine speeds.

While pre-charge mode is active, the ECU determines whether the vehicle speed is below a speed threshold for a set period of time (step 306). The vehicle speed may be detected by the vehicle speed sensor 224. The speed threshold and the length of the set period of time may be stored in the memory 214. The speed threshold and the set period of time may be adjusted. In some embodiments, they are adjusted based on driver preferences, manufacturer preferences, vehicle owner preferences, or any combination thereof.

The set period of time may be long enough to sufficiently determine that the vehicle 100 is indeed in traffic. In addition, the speed threshold may also be low enough to determine that the vehicle 100 is in traffic. For example, the speed threshold may be 10 miles per hour and the set period of time may be 15 minutes. When the vehicle 100 is driving at less than 10 miles per hour for 15 minutes, it may be safely determined that the vehicle 100 is in traffic.

In some embodiments, a difference between the speed limit and the detected speed of the vehicle 100 may be used in determining whether the vehicle 100 is in traffic. For example, when the vehicle 100 is driving at 10 miles per hour for 15 minutes in an area where the speed limit is 65 miles per hour, and the speed threshold is 20% of the speed limit, the ECU 202 may determine that the vehicle 100 is in traffic because the vehicle 100 is only traveling at 15.38% of the speed limit.

When the vehicle speed is not below the speed threshold for the set period of time, the pre-charge mode remains activated (step 316). In some situations, the anticipated time and/or location of the beginning of traffic determined by the navigation unit 210 based on the traffic data is not accurate. In these situations, the pre-charge mode should remain activated for as long as the vehicle 100 is operating at speeds where it is efficient for the engine 204 to generate additional energy to store in the battery 208.

When the vehicle speed is below the speed threshold for the set period of time, the ECU 202 disables the pre-charge mode (step 308). When the pre-charge mode is disabled, the engine 204 does not operate at a higher rate to generate extra power to be stored in the battery 208. Put differently, when the pre-charge mode is disabled, the engine 204 behaves and operates as it conventionally does.

The ECU 202 detects whether the state of charge of the battery 208 is below a lower threshold (step 310). The state of charge of the battery 208 may be detected by the battery sensor 230, which is communicatively coupled to the ECU 202. When the vehicle 100 is in traffic and has pre-charge mode disabled, the vehicle 100 may rely primarily (or in some embodiments, exclusively) on the battery 208 and the motor/generator 206 to propel the vehicle 100. Relying primarily on the motor/generator 206 is a more energy efficient way to propel the vehicle 100 in low speeds than using the engine 204. However, use of the motor/generator 206 may deplete the battery 208.

When the battery 208 falls below a lower state of charge threshold, the ECU 202 activates the pre-charge mode to engage the engine 204 in generating extra energy to recharge the battery 208 until the battery 208 reaches an upper state of charge threshold (step 312). When the battery 208 is above the lower state of charge threshold, the pre-charge mode remains disabled (step 314).

The navigation unit 210 determines whether the vehicle 100 is still in traffic in step 318. The navigation unit 210 may determine whether the vehicle 100 is still in traffic based on updated navigation data received from the remote data server 234. When the navigation data indicates that the vehicle 100 is still in traffic, the process 300 returns to step 306.

In some embodiments, step 318 is combined with step 306, and the vehicle 100 relies solely on the sensors of the sensor array 222 to determine whether the vehicle 100 remains in traffic.

In some embodiments, a pattern of engagement of the accelerator pedal and the brake pedal is used to determine whether the vehicle 100 is in traffic. When the vehicle 100 is in traffic, the driver may engage in a consistent alternating pattern of braking for a brief period of time and accelerating for a brief period of time. The ECU 202 may detect this pattern of braking and accelerating based on accelerator pedal data detected by the accelerator pedal sensor 228 and brake pedal data detected by the brake pedal sensor 226. The ECU 202 may also determine that the vehicle 100 is no longer in traffic based on the accelerator pedal data indicating that the accelerator pedal is being continuously engaged for a threshold period of time or a threshold distance. For example, when the accelerator pedal is engaged continuously for at least 10 seconds and/or for at least an eighth of a mile, the ECU 202 may determine that the vehicle 100 is no longer in traffic.

In other embodiments, a rate of deceleration is used to determine whether the vehicle 100 is in traffic. When the vehicle 100 has reached the anticipated traffic, the brake pedal may be engaged such that the vehicle 100 decelerates at a particular rate. The rate of deceleration may be detected by the inertial measurement unit 236, and when the detected deceleration of the vehicle exceeds a deceleration threshold, the ECU 202 may determine that the vehicle 100 has reached the anticipated traffic.

Any combination of the vehicle speed data, the brake pedal data, the accelerator pedal data, and the deceleration data may be used to determine whether the vehicle 100 is in traffic or whether the vehicle 100 is no longer in traffic.

Figure 4:
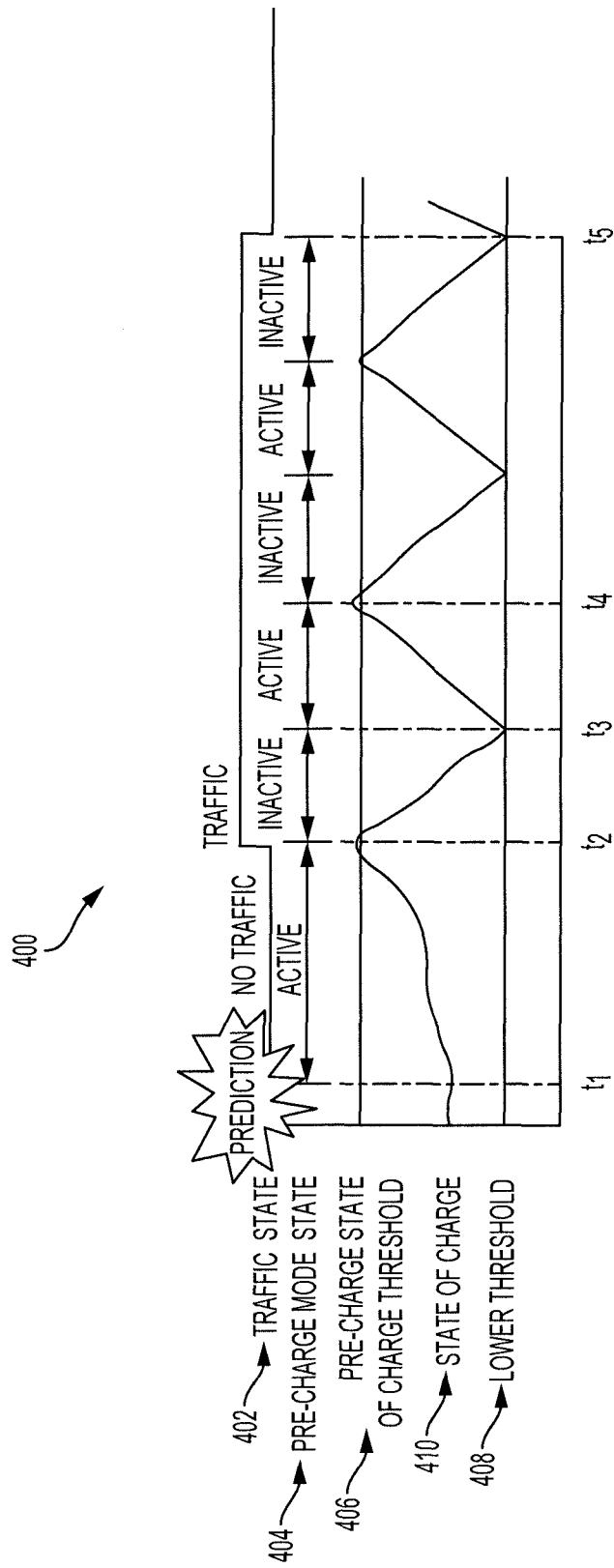
FIG. 4 is a diagram illustrating traffic, pre-charge mode state, threshold states of charge, and current state of charge over time, according to an aspect of the invention.

FIG. 4 illustrates a graph of traffic, the state of the pre-charge mode, and the state of charge of the vehicle over time, according to various embodiments of the invention. The graph 400 illustrates a state of traffic 402 (e.g., traffic or no traffic), a state of the pre-charge mode 404 (e.g., activated or deactivated), a pre-charge state of charge threshold 406 (or upper state of charge threshold), a lower state of charge threshold 408, and the state of charge 410 of the battery 208.

At time t1, the navigation unit 210 determines that traffic is upcoming ahead of the vehicle 100, as described herein. The vehicle 100 encounters traffic at time t2.

Between time t1 and time t2, the vehicle 100 operates with the pre-charge mode activated. Accordingly, the state of charge 410 of the battery 208 rises between time t1 and time t2, as the engine 204 provides extra energy to be stored in the battery 208.

The ECU 202 of the vehicle 100, using the vehicle speed data, the brake pedal data, the accelerator pedal data, and/or the deceleration data, determines that the vehicle 100 is in traffic at time t2, and accordingly the pre-charge mode is deactivated. While the pre-charge mode is deactivated, the motor/generator 206 uses the energy stored in the battery 208 to propel the vehicle 100. Accordingly, the state of charge 410 of the battery 208 falls.

At time t3, the state of charge 410 of the battery 208 falls to a lower state of charge threshold 408. When the battery sensor 230 detects that the state of charge of the battery 208 is below the lower state of charge threshold 408, the pre-charge mode is re-activated.

When the pre-charge mode is re-activated, the state of charge 410 of the battery 208 rises until the state of charge 410 of the battery 208 reaches the pre-charge state of charge threshold 406 at time t4.

At time t4, when the state of charge 410 of the battery 208 reaches the pre-charge state of charge threshold 406, the state of traffic 402 is determined. Whether the vehicle 100 is still in traffic may be determined using one or more sensors of the sensor array 222, as described herein, or may be determined based on the traffic data received from the remote data server 234. At time t4, it is determined that the vehicle 100 remains in traffic, and the pre-charge mode is disabled. Accordingly, the state of charge 410 of the battery 208 falls.

The process alternates until at time t5, the vehicle 100 is no longer in traffic. The ECU 202 may detect that the vehicle is no longer in traffic based on the sensor data from the one or more sensors of the sensor array 222 or the navigation unit 210 may determine that the vehicle is no longer in traffic based on the traffic data received from the remote data server 234. When the vehicle 100 is no longer in traffic, the pre-charge mode may be reactivated or may remain deactivated. In some embodiments, the pre-charge mode is reactivated when the navigation unit 210 detects further upcoming traffic or the pre-charge mode remains deactivated when the navigation unit 210 does not detect any upcoming traffic, and the vehicle 100 may operate as it is normally configured to operate.

Figure 5:
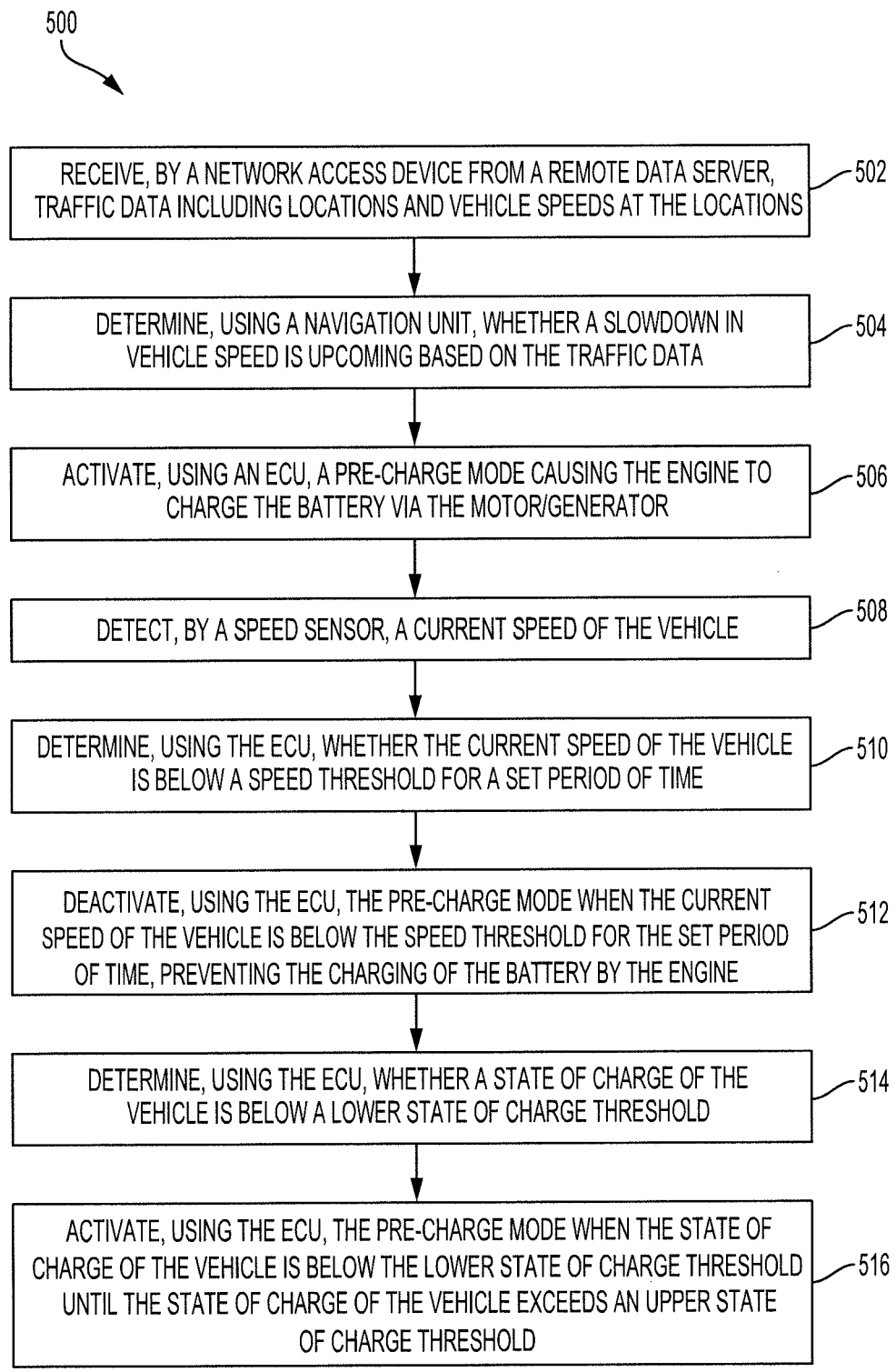
FIG. 5 is a flow diagram of an example process used by the improved battery pre-charge and deactivation system, according to an aspect of the invention.

FIG. 5 illustrates a flow diagram of a process, in accordance with various aspects of the invention. The process 500 may be practiced by the system 200 described herein.

A user of the vehicle 100, such as a driver or a passenger, may enter in a desired destination using the input unit 218. A navigation unit 210 receives the desired destination, determines a current location of the vehicle 100 based on the GPS data from the GPS unit 212, and determines a route. In some embodiments, when the vehicle 100 is a vehicle operated by a human, the route may be presented to the driver via the output unit 220 as a series of instructions for the driver to follow. In some embodiments, when the vehicle 100 is a fully autonomous or partially autonomous vehicle, the route may be used by the ECU 202 along with various sensors and actuators to drive the vehicle 100 to the destination along the route.

A network access device 216 receives, from a remote data server 234, the traffic data (step 502). The traffic data may include locations and vehicle speeds at the locations. The traffic data may be used to display a traffic status on the output unit 220, such as a display. In some embodiments, various locations on a map displayed by the output unit 220 are colored, indicating a traffic speed (e.g., red for slow vehicle speeds, yellow for intermediate vehicle speeds, and green for normal vehicle speeds).

A navigation unit 210 detects whether a slowdown in the vehicle speed is upcoming based on the traffic data received by the network access device 216 (step 504). That is, the navigation unit 210 detects whether traffic is upcoming along the route. The navigation unit 210 may have a threshold distance or time by which it determines when the traffic is upcoming. For example, when a slowdown in the vehicle speed is anticipated in 3 miles, the navigation unit 210 may detect that traffic is upcoming. In another example, when a slowdown in the vehicle speed is anticipated in 10 minutes (based on the vehicle's 100 current speed), the navigation unit 210 may detect that traffic is upcoming.

In addition, the navigation unit 210 may have a threshold reduction in speed by which it determines an anticipated slowdown in the vehicle speed. For example, the navigation unit 210 may detect a slowdown in the vehicle speed when the vehicle is expected to move at 20% of its current speed, such that if the current vehicle speed is 70 miles per hour, and in 3 miles the expected vehicle speed is 12 miles per hour (17% of the current speed), the navigation unit 210 will detect a slowdown in the vehicle speed is upcoming. In other embodiments, the navigation unit 210 may detect an upcoming reduction in the vehicle speed based on a comparison of the expected speed at an upcoming location along the route and a speed limit of the same location. For example, the speed limit of a location that is upcoming in 3 miles may be 65 miles per hour, and the expected speed at the location, based on the traffic data, may be 10 miles per hour. If the threshold expected speed to speed limit ratio is 20%, then the navigation unit 210 will detect that a slowdown in the vehicle speed is upcoming.

When the navigation unit 210 detects an upcoming slowdown in the vehicle speed, the ECU 202 activates a pre-charge mode (step 506). As described herein, the pre-charge mode causes the engine 204 to output additional power to be stored in the battery 208 via the motor/generator 206. The additional stored electrical energy stored in the battery 208 will be used when the vehicle 100 is in traffic.

A vehicle speed sensor 224 detects a current speed of the vehicle 100 (step 508). The ECU 202 determines whether the current speed of the vehicle 100 is below a speed threshold for a set period of time (step 510). When the ECU 202 determines that the current speed of the vehicle 100 is below the speed threshold for the set period of time, the ECU 202 may determine that the vehicle 100 has reached the expected vehicle speed slowdown that was anticipated in step 504.

When the current speed of the vehicle 100 is below the speed threshold for the set period of time, the ECU 202 deactivates the pre-charge mode so that the engine 204 does not run inefficiently in an effort to add additional charge to the battery 208 (step 512).

A battery sensor 230 detects a state of charge of the battery 208. The ECU 202 determines whether the state of charge of the battery 208 is below a lower state of charge threshold (step 514). When the battery 208 is below the lower state of charge threshold, the battery 208 has been used while the vehicle 100 was in traffic, and should be recharged to avoid the battery 208 being completely drained.

The ECU 202 activates the pre-charge mode to recharge the battery 208 when the state of charge of the battery 208 is below the lower state of charge threshold, and the pre-charge mode is kept active until the state of charge of the battery 208 exceeds an upper state of charge threshold (step 516).

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for managing energy efficiency of a vehicle having an engine, a motor/generator, and a battery, the system comprising:
    a GPS unit configured to detect a current location of the vehicle;
    a network access device configured to receive traffic data from a remote data server, the traffic data including locations and vehicle speeds at the locations;
    a navigation unit connected to the GPS unit and configured to determine a route to a destination and determine whether a slowdown in vehicle speed is upcoming along the route based on the traffic data;
    a speed sensor configured to detect a current speed of the vehicle;
    a battery sensor configured to detect a current state of charge of the battery; and
    an electronic control unit connected to the navigation unit, the speed sensor, and the battery sensor, the electronic control unit configured to:
        activate a pre-charge mode when the navigation unit detects an upcoming slowdown in vehicle speed based on the traffic data, the pre-charge mode causing the engine to charge the battery via the motor/generator, and
        deactivate the pre-charge mode to prevent charging of the battery by the engine when the detected current speed of the vehicle is below a speed threshold for a set period of time or distance.

2. The system of claim 1, wherein the electronic control unit is further configured to temporarily re-activate the pre-charge mode when the current state of charge of the battery is below a lower state of charge threshold until the current state of charge of the vehicle exceeds an upper state of charge threshold.

3. The system of claim 1, wherein the electronic control unit is further configured to re-activate the pre-charge mode when the navigation unit detects a second upcoming slowdown in vehicle speed.

4. The system of claim 1, further comprising a brake pedal sensor configured to detect brake pedal data and an accelerator pedal sensor configured to detect accelerator pedal data, and
    wherein the electronic control unit is connected to the brake pedal sensor and the accelerator pedal sensor and further configured to deactivate the pre-charge mode based on the brake pedal data and the accelerator pedal data indicating brief periods of braking alternating with brief periods of accelerating.

5. The system of claim 1, further comprising an inertial measurement unit configured to detect a deceleration of the vehicle, and
    wherein the electronic control unit is connected to the inertial measurement unit and further configured to deactivate the pre-charge mode when the deceleration of the vehicle exceeds a deceleration threshold and the detected current speed of the vehicle is below the speed threshold for the set period of time or distance.

6. The system of claim 1, further comprising a proximity sensor configured to detect proximity data of objects including other vehicles, and
    wherein the electronic control unit is connected to the proximity sensor and configured to deactivate the pre-charge mode when the proximity data indicates other vehicles within a threshold proximity to the vehicle for a set period of time.

7. The system of claim 1, wherein the navigation unit is further configured to detect whether the vehicle has reached an end of the slowdown in vehicle speed, and
wherein the electronic control unit is further configured to deactivate the pre-charge mode when the vehicle has reached the end of the slowdown in vehicle speed.

8. A hybrid vehicle having an engine, a motor/generator, and a battery, the hybrid vehicle comprising:
a GPS unit configured to detect a current location;
a network access device configured to receive traffic data from a remote data server, the traffic data including locations and vehicle speeds at the locations;
a navigation unit connected to the GPS unit and configured to determine a route to a destination and determine whether a slowdown in vehicle speed is upcoming along the route based on the traffic data;
a speed sensor configured to detect a current speed;
a battery sensor configured to detect a current state of charge of the battery; and
an electronic control unit connected to the navigation unit, the speed sensor, and the battery sensor, the electronic control unit configured to:
activate a pre-charge mode when the navigation unit detects an upcoming slowdown in vehicle speed, the pre-charge mode causing the engine to charge the battery via the motor/generator, and
deactivate the pre-charge mode to prevent charging of the battery by the engine when the detected current speed is below a speed threshold for a set period of time or distance.

9. The hybrid vehicle of claim 8, wherein the electronic control unit is further configured to temporarily re-activate the pre-charge mode when the current state of charge of the battery is below a lower state of charge threshold until the current state of charge of the vehicle exceeds an upper state of charge threshold.

10. The hybrid vehicle of claim 8, wherein the electronic control unit is further configured to re-activate the pre-charge mode when the navigation unit detects a second upcoming slowdown in vehicle speed.

11. The hybrid vehicle of claim 8, further comprising a brake pedal sensor configured to detect brake pedal data and an accelerator pedal sensor configured to detect accelerator pedal data, and
wherein the electronic control unit is connected to the brake pedal sensor and the accelerator pedal sensor and further configured to deactivate the pre-charge mode based on the brake pedal data and the accelerator pedal data indicating brief periods of braking alternating with brief periods of accelerating.

12. The hybrid vehicle of claim 8, further comprising an inertial measurement unit configured to detect a deceleration, and
wherein the electronic control unit is connected to the inertial measurement unit and further configured to deactivate the pre-charge mode when the deceleration exceeds a deceleration threshold and the detected current speed is below the speed threshold for the set period of time or distance.

13. The hybrid vehicle of claim 8, further comprising a proximity sensor configured to detect proximity data of objects including other vehicles, and
wherein the electronic control unit is connected to the proximity sensor and configured to deactivate the pre-charge mode when the proximity data indicates other vehicles within a threshold proximity for a set period of time.

14. The hybrid vehicle of claim 8, wherein the navigation unit is further configured to detect whether an end of the slowdown in vehicle speed has been reached, and
wherein the electronic control unit is further configured to deactivate the pre-charge mode when the end of the slowdown in vehicle speed has been reached.

15. A method for managing energy efficiency of a vehicle having an engine, a motor/generator, and a battery, the method comprising:
detecting, by a GPS unit, a current location of the vehicle;
receiving, by a network access device, traffic data from a remote data server, the traffic data including locations and vehicle speeds at the locations;
determining, by a navigation unit connected to the GPS unit, a route to a destination and determine whether a slowdown in vehicle speed is upcoming along the route based on the traffic data;
detecting, by a speed sensor, a current speed of the vehicle;
detecting, by a battery sensor, a current state of charge of the battery;
activating, by an electronic control unit, a pre-charge mode when the upcoming slowdown in vehicle speed is determined by the navigation unit, the pre-charge mode causing the engine to charge the battery via the motor/generator; and
deactivating, by the electronic control unit, the pre-charge mode to prevent charging of the battery by the engine when the detected current speed of the vehicle is below a speed threshold for a set period of time or distance.

16. The method of claim 15, further comprising temporarily re-activating, by the electronic control unit, the pre-charge mode when the current state of charge of the battery is below a lower state of charge threshold until the current state of charge of the vehicle exceeds an upper state of charge threshold.

17. The method of claim 15, further comprising re-activating, by the electronic control unit, the pre-charge mode when the navigation unit detects a second upcoming slowdown in vehicle speed.

18. The method of claim 15, further comprising:
detecting, by a brake pedal sensor, brake pedal data;
detecting, by an accelerator pedal sensor, accelerator pedal data; and
deactivating, by the electronic control unit, the pre-charge mode based on the brake pedal data and the accelerator pedal data indicating brief periods of braking alternating with brief periods of accelerating.

19. The method of claim 15, further comprising detecting, by an inertial measurement unit, a deceleration of the vehicle; and
deactivating, by the electronic control unit, the pre-charge mode when the deceleration of the vehicle exceeds a deceleration threshold and the detected current speed of the vehicle is below the speed threshold for the set period of time or distance.

20. The method of claim 15, further comprising:
detecting, by the navigation unit, whether the vehicle has reached an end of the slowdown in vehicle speed; and
deactivating, by the electronic control unit, the pre-charge mode when the vehicle has reached the end of the slowdown in vehicle speed.

* * * * *